US010874054B2

(12) United States Patent
Krystowski et al.

(10) Patent No.: US 10,874,054 B2
(45) Date of Patent: Dec. 29, 2020

(54) PARK BRAKE AND TRACTION DRIVE BYPASS INTERLOCK

(71) Applicant: MTD Products Inc, Valley City, OH (US)

(72) Inventors: Adam Krystowski, Medina, OH (US);
Daniel Morse, Burbank, OH (US);
Michael Utz, Streetsboro, OH (US);
Carl Tyler, Wadsworth, OH (US);
Adam Woodrum, Wakeman, OH (US)

(73) Assignee: MTD PRODUCTS INC, Valley City, OH (US)

( * ) Notice: Subject to any disclaimer, the term of this patent is extended or adjusted under 35 U.S.C. 154(b) by 460 days.

(21) Appl. No.: 15/513,794

(22) PCT Filed: Sep. 24, 2015

(86) PCT No.: PCT/US2015/051866
§ 371 (c)(1),
(2) Date: Mar. 24, 2017

(87) PCT Pub. No.: WO2016/049275
PCT Pub. Date: Mar. 31, 2016

(65) Prior Publication Data
US 2017/0247021 A1 Aug. 31, 2017

Related U.S. Application Data

(60) Provisional application No. 62/054,731, filed on Sep. 24, 2014.

(51) Int. Cl.
| *A01D 69/03* | (2006.01) |
| *A01D 34/00* | (2006.01) |
| *A01D 69/10* | (2006.01) |
| *A01D 34/68* | (2006.01) |
| *B60K 28/04* | (2006.01) |
| *F16H 61/4043* | (2010.01) |
| *B60K 17/10* | (2006.01) |

(Continued)

(52) U.S. Cl.
CPC ........... *A01D 69/03* (2013.01); *A01D 34/006* (2013.01); *A01D 34/6812* (2013.01);
(Continued)

(58) Field of Classification Search
CPC .............. B60W 10/103; B60W 10/182; Y10T 74/20073; F16H 59/54; F16H 59/06;
(Continued)

(56) References Cited

U.S. PATENT DOCUMENTS 2,507,016 A * 5/1950 Hesh ...................... H01H 25/04
200/6 A
3,539,040 A * 11/1970 Edwards ............ B62D 49/0692
188/265

(Continued)

OTHER PUBLICATIONS

International Search Report and Written Opinion dated Jan. 14, 2016 in PCT/US2015/051866 filed Sep. 24, 2015.

*Primary Examiner* — Richard M Lorence
(74) *Attorney, Agent, or Firm* — Wegman Hessler

(57) ABSTRACT

Methods and apparatus for a lawn maintenance vehicle park brake and traction drive interlock are provided. A park brake mechanism is selectively operable between an engaged position and a disengaged position. A traction drive is also mounted to the lawn maintenance vehicle, the traction drive having a disable mode which prohibits transmission of a driving force from the traction drive to a drive wheel. A first operable connection between the park brake mechanism and a wheel brake activates the wheel brake. A second operable connection between the park brake mechanism and the traction drive activates the disable mode of the traction drive. A method of controlling a lawn maintenance vehicle with a park brake and traction drive interlock include the steps of providing a lawn maintenance vehicle, providing an operable park brake mechanism, providing a first operable connection, and providing a second operable connection.

15 Claims, 10 Drawing Sheets

(51) Int. Cl.
  *G05G 9/00* (2006.01)
  *B60T 1/00* (2006.01)
  *B60T 7/10* (2006.01)
  *B60T 11/04* (2006.01)
  *F16H 59/02* (2006.01)
  *A01D 101/00* (2006.01)

(52) U.S. Cl.
  CPC ............. *A01D 69/10* (2013.01); *B60K 17/10* (2013.01); *B60K 28/04* (2013.01); *B60T 1/005* (2013.01); *B60T 7/104* (2013.01); *B60T 11/046* (2013.01); *F16H 61/4043* (2013.01); *G05G 9/00* (2013.01); *A01D 2101/00* (2013.01); *B60W 2300/156* (2013.01); *B60Y 2200/223* (2013.01); *F16H 2059/0282* (2013.01)

(58) Field of Classification Search
  CPC . F16H 61/4043; F16H 61/437; A01D 34/006; A01D 34/6812; A01D 69/03; A01D 69/10; A01D 2101/00; B60Y 2200/223; B60T 1/005; B60T 7/104; B60T 7/12; B60T 11/046; B62D 49/0692; B60K 17/10; B60K 28/04; G05G 9/00; G05G 9/08
  USPC ...................................................... 192/220.1
  See application file for complete search history.

(56) References Cited

U.S. PATENT DOCUMENTS

| | | | |
|---|---|---|---|
| 4,049,096 A * | 9/1977 | Barth | B60T 11/103 192/13 R |
| 4,088,208 A * | 5/1978 | Goode | B60T 11/103 192/220.1 |
| 4,759,417 A * | 7/1988 | Wanie | B60K 20/00 180/273 |
| 5,062,510 A * | 11/1991 | Shimizu | B60W 10/10 192/220.1 |
| 5,586,955 A | 12/1996 | Wanie | |
| 6,056,074 A | 5/2000 | Heal et al. | |
| 6,092,617 A | 7/2000 | White, III et al. | |
| 6,145,312 A | 11/2000 | Hauser et al. | |
| 6,256,989 B1 | 7/2001 | Hauser et al. | |
| 6,301,864 B1 | 10/2001 | Damie et al. | |
| 6,370,876 B1 | 4/2002 | Langenfeld | |
| 6,374,604 B1 | 4/2002 | Poplawski et al. | |
| 6,378,300 B1 | 4/2002 | Johnson et al. | |
| 6,434,917 B1 | 8/2002 | Bartel | |
| 6,550,244 B1 | 4/2003 | Langenfeld | |
| 6,651,427 B1 | 11/2003 | Poplawski | |
| 6,739,116 B2 | 5/2004 | Stover et al. | |
| 6,755,019 B1 | 6/2004 | Phanco | |
| 6,804,958 B1 | 10/2004 | Poplawski et al. | |
| 6,935,106 B2 | 8/2005 | Korthals | |
| 7,007,467 B1 | 3/2006 | Hauser et al. | |
| 7,032,377 B1 | 4/2006 | Keller et al. | |
| 7,111,459 B1 | 9/2006 | Brookens et al. | |
| 7,121,092 B1 | 10/2006 | Phanco et al. | |
| 7,131,267 B1 | 11/2006 | Keller et al. | |
| 7,174,712 B1 | 2/2007 | Brookens et al. | |
| 7,299,610 B2 | 11/2007 | Piontek | |
| 7,360,358 B1 | 4/2008 | Phanco et al. | |
| 7,451,865 B2 | 11/2008 | Eavenson, Sr. et al. | |
| 8,122,695 B2 | 2/2012 | Suhara | |
| 8,857,558 B2 | 10/2014 | Poe | |
| 9,386,739 B2 | 7/2016 | Poe | |
| 2014/0260151 A1 | 9/2014 | Poe | |

* cited by examiner

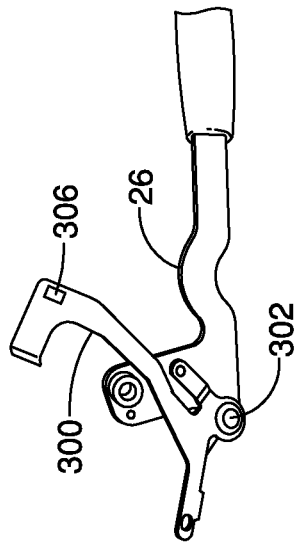
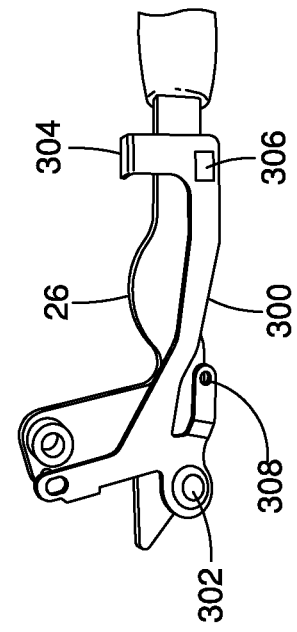
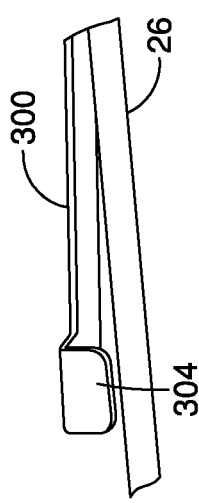
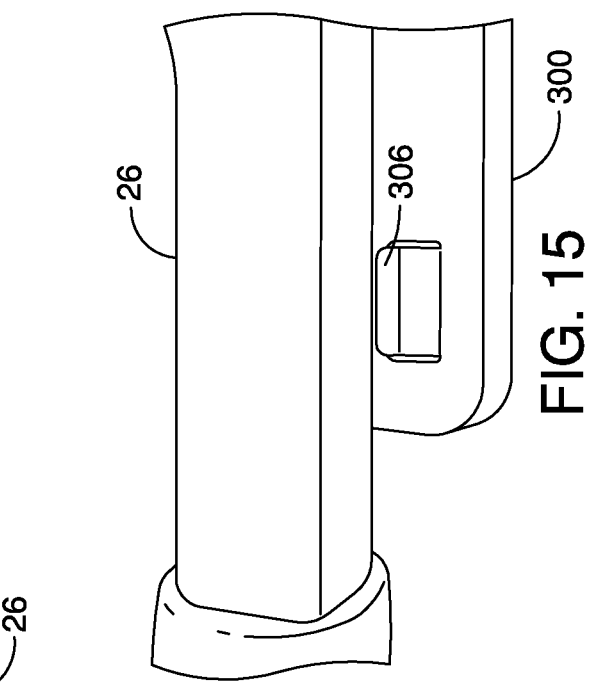

PARK BRAKE AND TRACTION DRIVE BYPASS INTERLOCK

This application claims the benefit of U.S. Provisional Application No. 62/054,731, filed Sep. 24, 2014, the entire disclosure of which is hereby incorporated herein by reference.

BACKGROUND

1. Field of the Disclosure

This application relates generally to self-propelled lawn maintenance vehicles, and more specifically to a self-propelled lawn maintenance vehicle including a traction drive bypass interlock.

2. Description of Related Art

Currently available lawn maintenance vehicles can be provided with interlocks to prevent start-up of the lawn maintenance vehicles unless their speed and/or direction controls are in their neutral positions. Additional interlocks may be provided to prevent travel of the lawn maintenance vehicle without an operator properly located within the operator zone (usually the operator's seat). This is usually accomplished by disabling a start control power circuit unless the parking brake mechanism is engaged and the speed-directional controls are in their neutral positions.

The above configurations typically require a combination of electronic sensors (typically switches) for the park brake mechanism and mechanical interlocks for the speed-directional controls that incorporate electronic sensors (typically switches) for neutral interlock positions. The mechanical interlocks for the speed-directional controls are typically accomplished by secondary movements of the controls into features (e.g., slotted sections that receive the speed-directional controls) that prevent movement out of the neutral position and allow activation of the neutral position switches. Additionally, a park brake mechanism is often integrated into the mechanical interlock mechanism for the speed-directional controls so as to prevent movement out of the neutral position. The park brake mechanism also provides activation of electronic sensors (typically switches) for the neutral interlock positions and the park brake engaged position. These sensors and switches can often be relatively expensive and add unnecessary assembly time to the lawn maintenance vehicle. Accordingly, improvements to lawn maintenance vehicles are desired.

SUMMARY

The following presents a simplified summary in order to provide a basic understanding of some example aspects of the disclosure. This summary is not an extensive overview. Moreover, this summary is not intended to identify critical elements of the disclosure nor delineate the scope of the disclosure. The sole purpose of the summary is to present some concepts in simplified form as a prelude to the more detailed description that is presented later.

According to one aspect, the subject application involves a lawn maintenance vehicle park brake and traction drive interlock. The park brake and traction drive interlock includes a park brake mechanism mounted to a lawn maintenance vehicle. The park brake mechanism is selectively operable between an engaged position and a disengaged position. The park brake and fraction drive interlock also includes a fraction drive mounted to the lawn maintenance vehicle. The traction drive comprises a disable mode which prohibits transmission of a driving force from the traction drive to a drive wheel of the lawn maintenance vehicle. The park brake and traction drive interlock further includes a first operable connection between the park brake mechanism and a wheel brake. When the park brake mechanism is in the engaged position, the first operable connection activates the wheel brake. The park brake and traction drive interlock still further includes a second operable connection between the park brake mechanism and the traction drive. When the park brake mechanism is in the engaged position, the second operable connection activates the disable mode of the traction drive.

According to another aspect, the subject application involves a method of controlling a lawn maintenance vehicle. The method comprises the step of providing a lawn maintenance vehicle including a traction drive. The traction drive includes a disable mode. The method also includes the step of providing an operable park brake mechanism attached to the lawn maintenance vehicle. The park brake mechanism is selectively operable between an engaged position and a disengaged position. The method further includes the step of providing a first operable connection between the park brake mechanism and a wheel brake. When the park brake mechanism is in the engaged position, the first operable connection activates the wheel brake. The method still further includes the step of providing a second operable connection between the park brake mechanism and the traction drive. When the park brake mechanism is in the engaged position, the second operable connection activates the disable mode of the traction drive.

According to another aspect, the subject application involves a lawn maintenance vehicle park brake and traction drive interlock including a park brake mechanism mounted to a lawn maintenance vehicle. The park brake mechanism includes a park brake handle. The park brake handle is selectively operable between an engaged position and a disengaged position. The park brake and traction drive interlock also includes a traction drive mounted to the lawn maintenance vehicle. The traction drive includes a disable mode which prohibits transmission of a driving force from the traction drive to a drive wheel of the lawn maintenance vehicle. The park brake and traction drive interlock further includes a first operable connection between the park brake mechanism and a wheel brake. When the park brake mechanism is in the engaged position, the first operable connection activates the wheel brake. The park brake and traction drive interlock still further includes a second operable connection between the park brake mechanism and the traction drive. When the park brake mechanism is in the engaged position, the second operable connection activates the disable mode of the traction drive. The second operable connection between the park brake mechanism and the traction drive is configured to be selectively operable independently of the park brake handle.

BRIEF DESCRIPTION OF THE DRAWINGS

The foregoing and other aspects of the present disclosure will become apparent to those skilled in the art to which the present disclosure relates upon reading the following description with reference to the accompanying drawings, in which:

FIG. 11 is a side detail view of the park brake handle with a lever showing the lever in a position of dependent movement with the park brake handle;

FIG. 12 is similar to FIG. 11 showing the lever in a position of independent movement from the park brake handle;

FIG. 13 is a top detail view of the park brake handle showing the lever in a release position;

FIG. 14 is a side detail view of the park brake handle and the lever showing a tab and a locking tab; and FIG. 15 is a side detail view showing the locking tab cooperating with the park brake handle.

DETAILED DESCRIPTION

Figure 1:
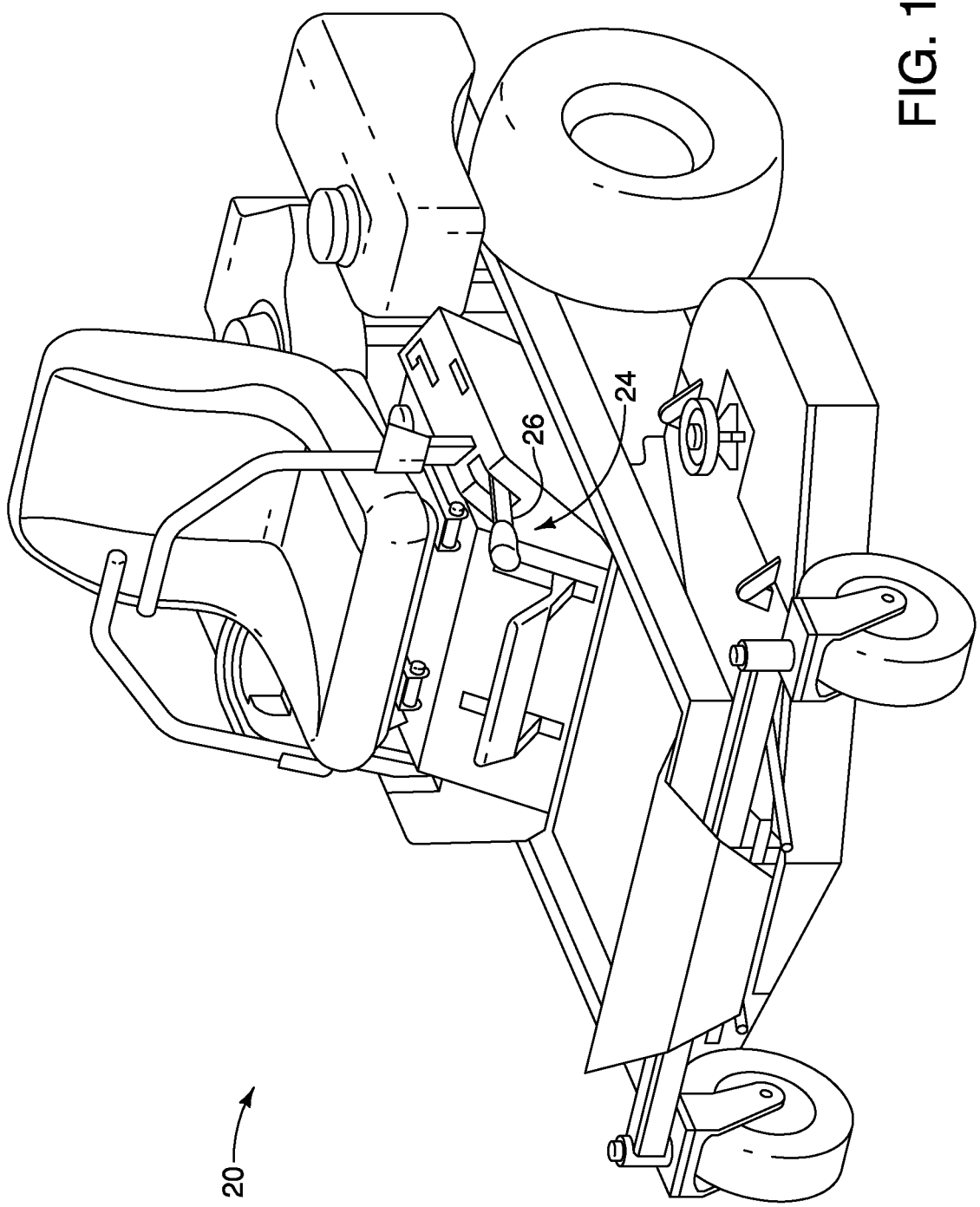
FIG. 1 is a perspective view of a lawn maintenance vehicle including a park brake and hydrostatic traction drive interlock in accordance with aspects of the present disclosure.

Example embodiments that incorporate one or more aspects of the present disclosure are described and illustrated in the drawings. These illustrated examples are not intended to be a limitation on the present disclosure. For example, one or more aspects of the present disclosure can be utilized in other embodiments and even other types of devices. Moreover, certain terminology is used herein for convenience only and is not to be taken as a limitation on the present disclosure. Still further, in the drawings, the same reference numerals are employed for designating the same elements.

FIG. 1 shows a perspective view of an example lawn maintenance vehicle 20. A park brake and traction drive interlock 24 according to at least one aspect of the present disclosure is shown mounted to the lawn maintenance vehicle 20. It is to be understood that the illustrated lawn maintenance vehicle 20 is merely one example of a lawn maintenance vehicle, and any suitable lawn maintenance vehicle can include the described park brake and traction drive interlock 24. It is also to be understood that a limited number of parts of the park brake and traction drive interlock 24 are shown in FIG. 1, such as the park brake handle 26, with the remainder being obscured from view by other portions of the lawn maintenance vehicle 20.

Figure 2:
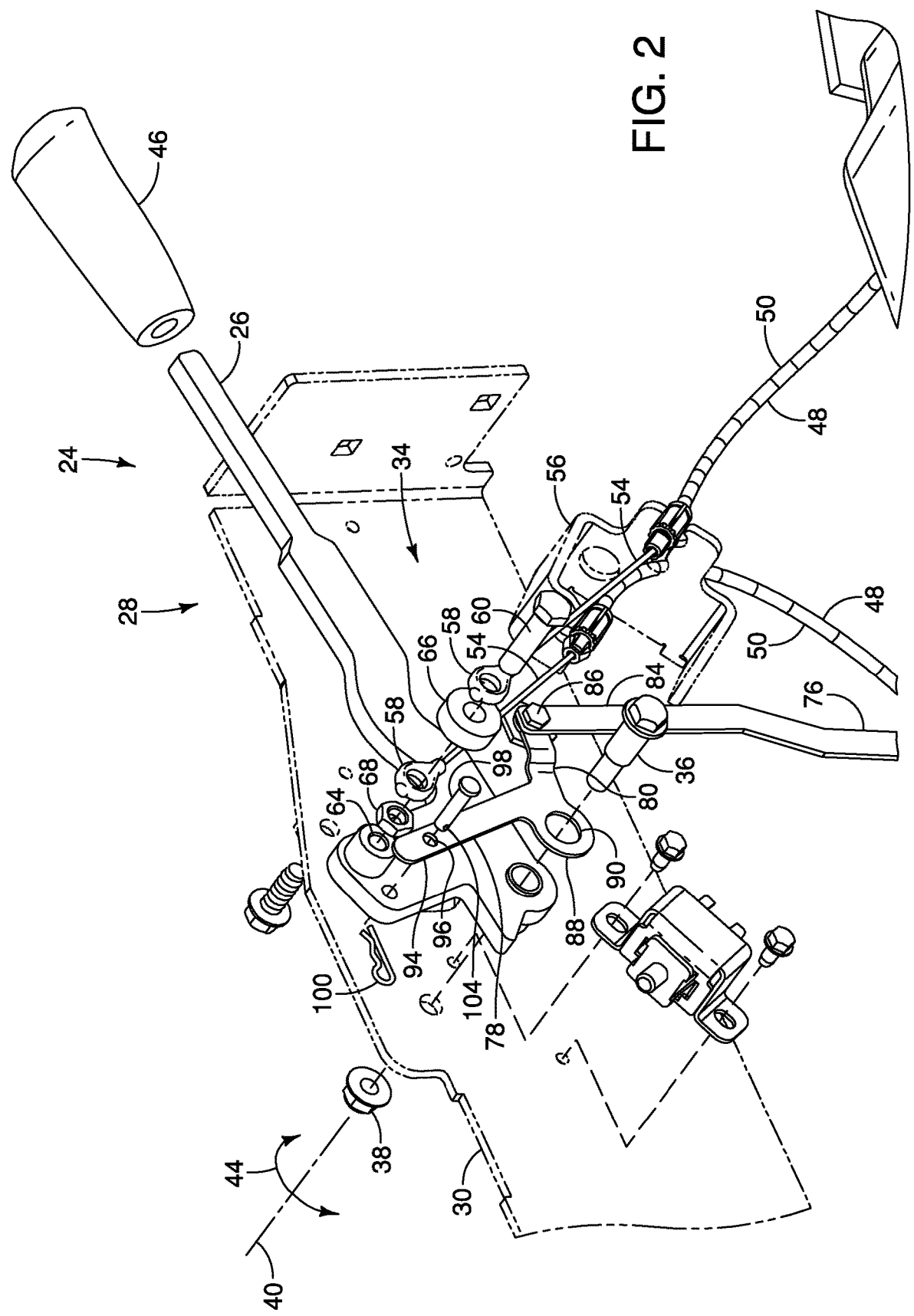
FIG. 2 is a partially-exploded perspective view of some components of the lawn maintenance vehicle of FIG. 1.

Turning to FIG. 2, a portion of the park brake and traction drive interlock 24 is shown in a partially exploded view. A park brake mechanism 28 is mounted to a fixed part 30 of the lawn maintenance vehicle 20, such as a frame member. The park brake mechanism 28 can include a handle assembly 34. In the shown example, the handle assembly 34 is rotatably mounted to the fixed part 30 about a bolted connection including a shoulder bolt 36 and a nut 38. This mounting arrangement enables the handle assembly 34 to rotate about an axis 40 in the directions represented by the two-headed arrow 44. However, any suitable mounting arrangement can be used, so long as the mounting enables the handle assembly 34 to be selectively operable between an engaged position and a disengaged position. FIG. 2 shows the handle assembly 34, and thus the park brake mechanism 28, located in the disengaged position and thereby actuating and/or releasing one or more mechanical mechanisms which prohibit the rotation of the wheels of the lawn maintenance vehicle 20.

In one example, the handle assembly 34 can include the park brake handle 26 and a handle grip 46. The handle assembly 34 can further include a plurality of operable connections to other devices which may be located at a distance from the handle assembly 34. As shown in FIG. 2, the handle assembly 34 can include at least one connection with a brake mechanism actuating cable, or more simply, a brake mechanism actuating cable assembly 48.

The brake mechanism actuating cable assembly 48 can include a sheath 50 and an internal brake cable 54. A terminus of the sheath 50 can be mounted to a fixed position such as a bracket 56. The internal brake cable 54 can then extend a distance from the terminus of the sheath 50 to be mounted to a portion of the handle assembly 34. In one example, the end of the internal brake cable 54 can include any suitable cooperating connection 58 (e.g., a lanyard) with the handle assembly 34. A connecting element 60 (e.g., a cap screw, a pin, or a bolt) can pass through the central aperture of the connection 58 and mount to a suitably receiving portion 64 (e.g., a female threaded element) of the handle assembly 34. Other hardware such as a spacer 66 and a nut 68 can be included in the internal brake cable 54 mounting arrangement. This mounting arrangement enables the movement of the internal brake cable 54 relative to the sheath 50 as the park brake handle 26 is rotated between the disengaged position and the engaged position. For example, as the park brake handle 26 rotates about the axis 40, the terminus of the sheath 50 is held stationary by bracket 56 while the connection 58 and the end of the internal brake cable 54 move in an arc path about the axis 40. The brake mechanism actuating cable assembly 48 is one example of a first operable connection between the park brake mechanism 28 and a wheel brake (not shown).

Figure 3:
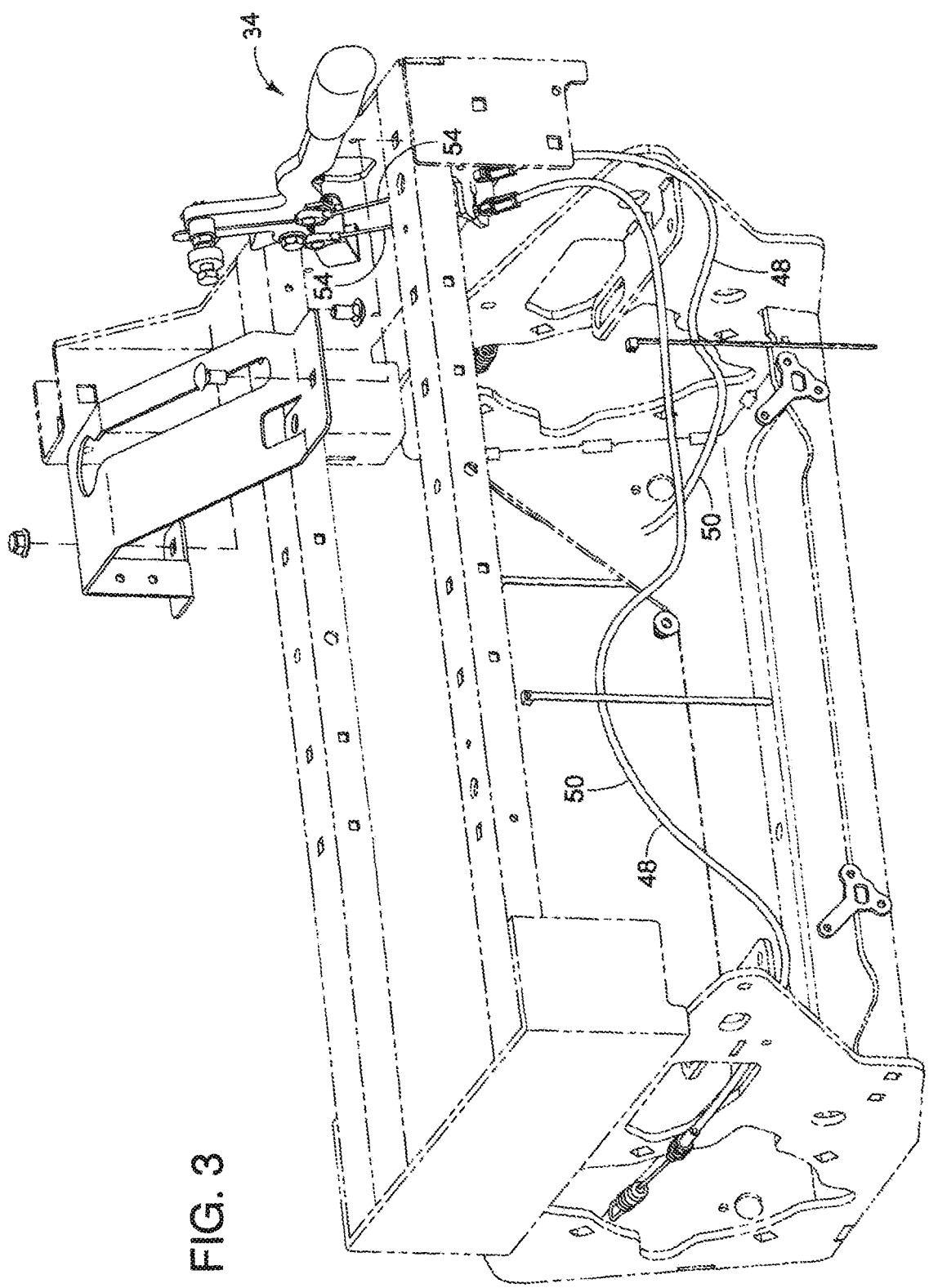
FIG. 3 is a partially-exploded perspective view of some components of the lawn maintenance vehicle of FIG. 1 showing a first operable connection in a disengaged position.

Turning to FIG. 3, two brake mechanism actuating cable assemblies 48 are shown mounted to the handle assembly 34 as described above. Each brake mechanism actuating cable assembly 48 is inserted through and among the internal components of the lawn maintenance vehicle 20 (many components not shown for clarity in FIG. 3) to a location adjacent a drive wheel 70 (best seen in FIG. 4). The drive wheel 70 can include a suitably connected mechanical braking mechanism such as a wheel brake or drum brake which maintains the lawn maintenance vehicle 20 in a stationary position by way of prohibiting rotation of one or more wheels.

Figure 4:
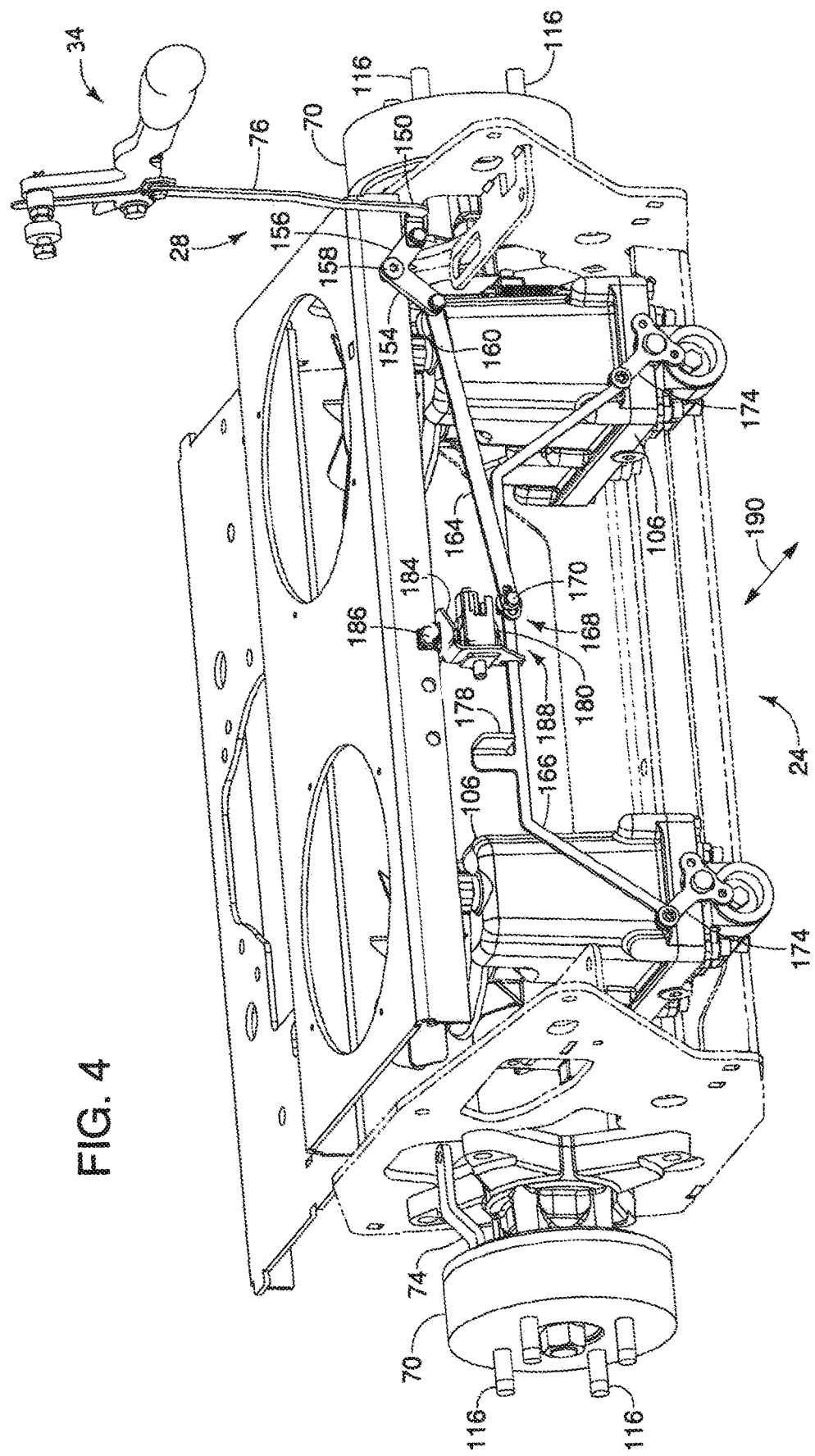
FIG. 4 is a perspective view of some components of the lawn maintenance vehicle of FIG. 1 showing a second operable connection in a disengaged position.
Figure 5:
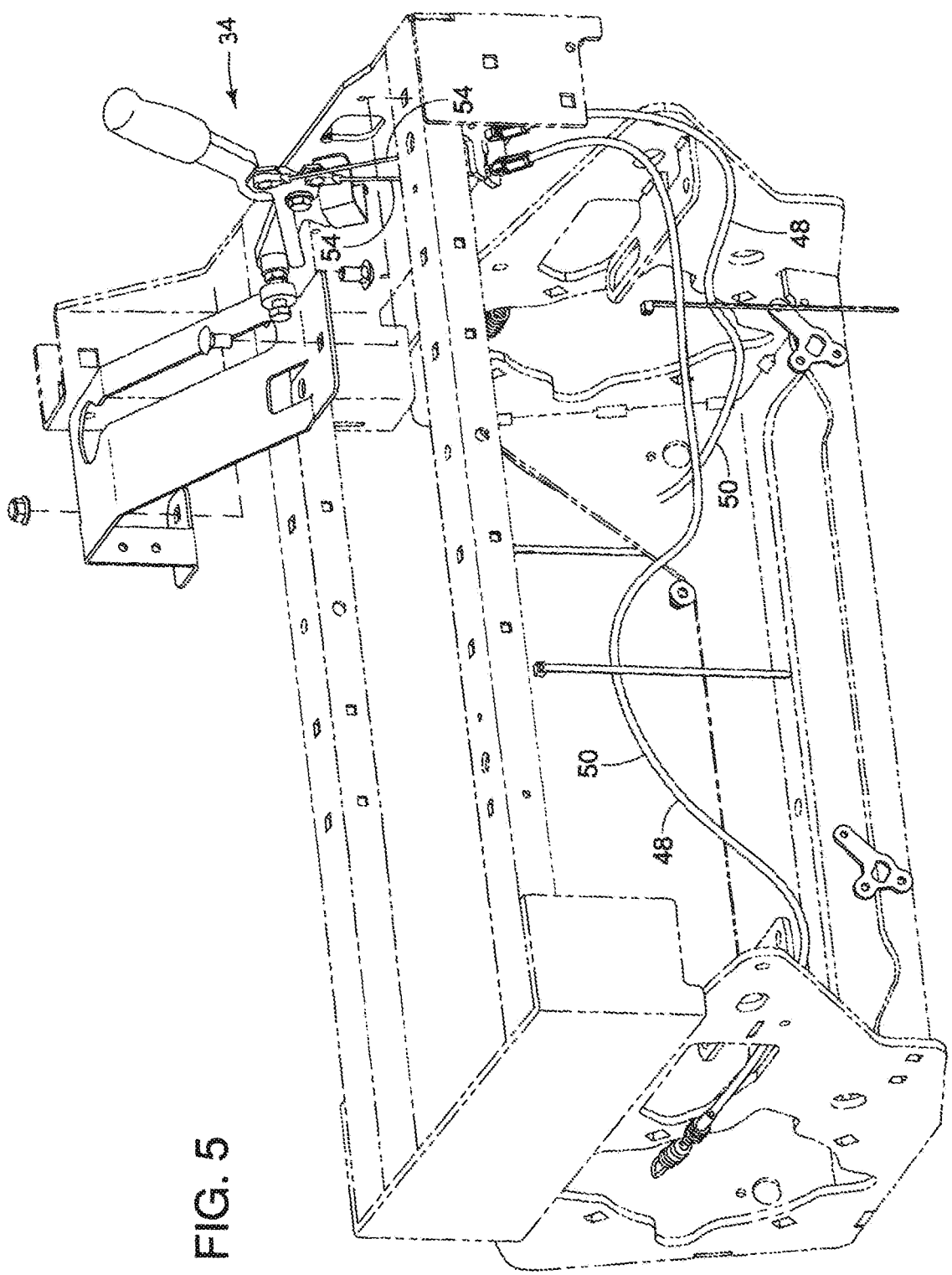
FIG. 5 is similar to FIG. 3 with the park brake mechanism and the first operable connection in an engaged position.

Turning to FIG. 4, an arm 74 can extend from the wheel brake in the drive wheel 70 toward the location of the end of the brake mechanism actuating cable assembly 48. Returning to FIG. 3, as the handle assembly 34 of the brake mechanism is rotated into the engaged position, the internal brake cable 54 is pulled through the sheath 50 to activate the wheel brake. FIGS. 3 and 4 show the park brake mechanism 28 in the disengaged position (park brake off) while FIG. 5 shows the park brake mechanism 28 in the engaged position (park brake on). In this described configuration, when the park brake mechanism 28 is in the engaged position, the first operable connection (e.g., the brake mechanism actuating cable assembly 48) activates one or more wheel brakes.

Returning to FIG. 4, the lawn maintenance vehicle 20 can include two drive wheels 70. Other examples can include greater numbers of drive wheels. In these examples, the park brake and traction drive interlock 24 can include a plurality of wheel brakes and a plurality of first operable connections. Each of the wheel brakes acts on one of the drive wheels 70 of the lawn maintenance vehicle 20, and each of the first operable connections are located between the park brake mechanism 28 and one of the wheel brakes.

By way of a brief description, a "transmission" brake system, is typically an inboard vehicle brake that is applied to the drivetrain rather than to the wheels of a vehicle. As the transmission brake is mounted inboard of the final drive and any reduction gearing that may be present, the brake rotates relatively faster, but with less torque, than a wheel brake. The transmission brake thus has more holding ability than its small size might suggest, but is typically less suitable for driving loads. The braking forces would also be passed through the final drive and axle drive shafts, with possible risk of overloading them. One advantage of a transmission brake is that it can lock the entire drivetrain, including all four wheels of a four wheel drive vehicle. As such, a transmission brake is convenient to be used as a parking brake. A second advantage is that transmission brakes can remove the need to provide cable connections to the wheel brakes, where they may be prone to damage. For the purposes of this disclosure, the transmission brake system operates with one or more mechanical braking mechanisms to collectively prohibit drive wheel 70 rotation.

Returning to FIG. 2, the handle assembly 34 can also include a mounting connection to a first link 76. In the shown example, the first link 76 can be mounted to the handle assembly 34 in conjunction with a lever 78. As shown, the lever 78 can have a number of arms which terminate in mounting points. A first arm 80 can include a mounting point for a first end 84 of the first link 76, which can be mounted to the lever 78 by any suitable means. For example, the first link 76 can be mounted to the first arm 80 by a threaded fastener such as a screw 86. A second arm 88 can include an aperture 90 suitable for cooperation with the shoulder bolt 36. A third arm 94 can include a mounting point to secure the lever 78 to the park brake handle 26. In the shown example, the third arm 94 defines an aperture 96 cooperating with a pin 98 which passes through both the lever 78 and the park brake handle 26. A cotter pin 100, or other similar device can interact with a distal end 104 of the pin to prevent unintended removal of the pin from the aperture 96. Mounting the lever 78 to the park brake handle 26 at the described locations enables the lever 78 to be fixed with the park brake handle 26 during rotational motion about the axis 40 as the park brake handle 26 rotates between the disengaged position and the disengaged position. As the park brake handle 26 rotates, the lever 78 also rotates with it in the direction of arrow 44, thus moving the first link 76. Of course, the lengths and angles of the first arm 80, the second arm 88, and the third arm 94 can be selected to produce a desired distance of travel of the first link 76. The first link 76 is one example of a second operable connection between the park brake mechanism 28 and the traction drive which is described below. Other examples of a second operable connection can include, but are not limited to, a cable, an electrical connection, an electronic connection, etc.

Figure 6:
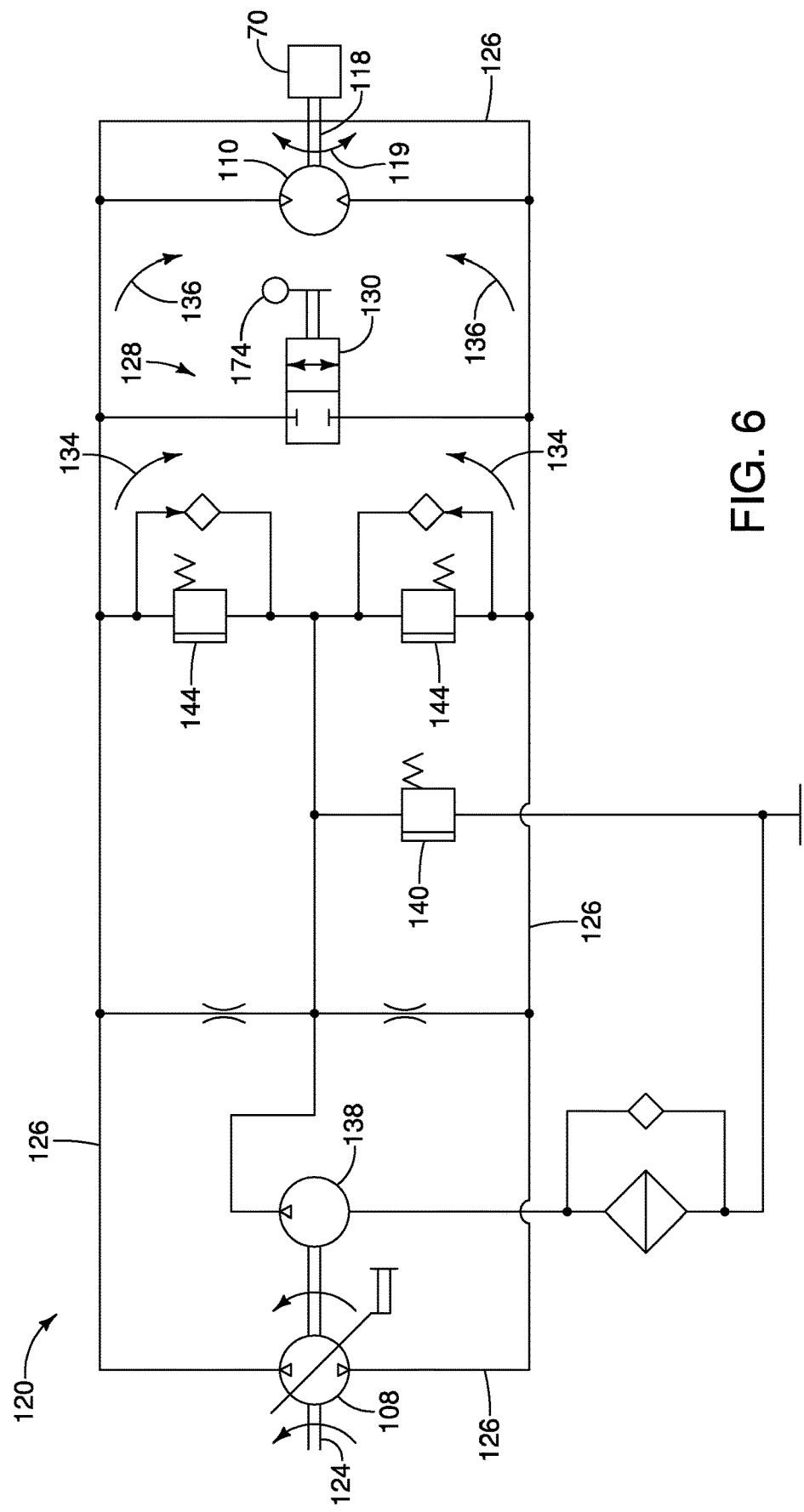
FIG. 6 is a hydraulic schematic of one example hydrostatic traction drive for the lawn maintenance vehicle of FIG. 1.

Returning to FIG. 4, a fraction drive 106 is mounted to the lawn maintenance vehicle 20. In one example, the traction drive 106 includes a fluid pump 108 operably connected to an external power source such as an internal combustion engine (not shown). The traction drive 106 further includes a fluid-driven, hydraulic motor 110 which is connected to one or more of the drive wheels 70 of the lawn maintenance vehicle 20. In the shown example, the pump 108 and the hydraulic motor 110 are combined in a single package (best seen schematically in FIG. 6), attached to a chassis structure of the lawn maintenance vehicle 20, such as the frame. However, any suitable hydrostatic traction drive is contemplated for use with this disclosure.

While not shown, it is to be appreciated that the drive wheel 70 can further transmit driving force as a rotational motion to a hub and a tire through a set of lugs 116 located on the drive wheel 70.

Returning to FIG. 6, a schematic of an example hydrostatic traction drive circuit 120 is shown. The hydrostatic traction drive 106 can include the pump 108 which is shown driven by a shaft 124. In one example, the shaft 124 can include a pulley and is belt-driven by an external power source such as an internal combustion engine (not shown). The pump 108 can be a variable displacement pump such that the external power source can be operated independently at any desired rotational speed while varying a volumetric output of the pump 108. A particular desired rotational speed can be selected for any number of various reasons. In one example, the external power source (e.g., an internal combustion engine) can be operated at a constant rotational speed that results in an optimal operating efficiency of the external power source even while varying the volumetric output of the pump 108.

It is to be understood that while the passage of the hydraulic fluid through the hydraulic motor 110 causes a corresponding, one directional, rotational motion of a shaft 118 within the hydraulic motor 110, the direction of the hydraulic fluid can be selected between one of two different path directions as represented by arrow 119. One flow path can result in rotational motion of the shaft 118 in one direction which then transmits a driving force from the traction drive 106 to the drive wheel 70 to turn the drive wheel 70 in a first direction (e.g., a forward driving direction). The other flow path results in rotational motion of the shaft 118 in the opposite direction, transmitting a driving force from the traction drive 106 to the drive wheel 70, turning the drive wheel 70 in a second direction (e.g., a reverse driving direction).

Additionally, the pump 108 can generate two-directional fluid flow from a shaft 124 input having only one direction of rotation. As such, the pump 108 can propel the lawn maintenance vehicle 20 in a forward direction or a reverse direction using input from the shaft 124 rotating in only a single direction. The pump 108 pressurizes and moves a quantity of fluid medium (e.g., hydraulic fluid) through a number of fluid conduits 126 around the exterior of the circuit 120. As shown on the opposite side of the circuit 120, the traction drive 106 also includes the bi-directional hydraulic motor 110 which can then transfer force within the fluid medium to physical rotation of the shaft 118 selectively in either rotational direction. The shaft 118 can be attached to one or more drive wheels 70, thereby selectively producing forward or reverse travel rotation of the drive wheel(s) 70.

The hydrostatic fraction drive circuit 120 includes a hydraulic bypass circuit 128 which is used to place the traction drive 106 into the disable mode. The disable mode prohibits transmission of the driving force and rotational movement of the shaft 124 of the traction drive 106 to the drive wheel 70 of the lawn maintenance vehicle 20. In the shown example, the hydraulic bypass circuit 128 is controlled by a mechanical bypass valve 130 which is connected in parallel with the hydraulic pump 108 and the hydraulic motor 110. When an operator chooses to activate or engage the bypass circuit 128, the bypass valve 130 is opened (the right-side position of the bypass valve 130 in the schematic) to permit fluid medium flow according to either arrow 134. Activation of the bypass circuit 128 can be considered placing the hydrostatic traction drive 106 into a bypass mode. In the bypass mode, the fluid medium propelled by the pump 108 travels through the bypass valve 130 and back to the pump 108 by re-entering the hydrostatic traction drive circuit 120 instead of flowing through a conduit 126 according to either arrow 136.

As such, in the foregoing described bypass mode, the fluid medium does not develop rotational motion in the hydraulic motor 110, and the bypass valve 130 places the circuit 120 into a hydraulic neutral position. This lack of rotational motion in the hydraulic motor 110 prohibits transmission of the driving force from the traction drive 106 to the drive wheel 70.

Other components of the hydraulic traction drive circuit 120 can include a charge pump 138, a main relief valve 140, and a pair of secondary relief valves 144 (one for each direction of fluid medium flow) which enhance operation of the traction drive 106, but are not related to the specific operations of the traction drive 106 as described in the present disclosure.

As a brief summary, upon actuation of the pump 108 by an external power source such as an internal combustion engine (not shown) located on the lawn maintenance vehicle 20, a quantity of hydraulic fluid is moved to the hydraulic motor 110 under pressure. The passage of the hydraulic fluid through the hydraulic motor 110 causes a corresponding, one directional, rotational motion of a shaft 118 within the hydraulic motor 110 which then transmits a driving force from the traction drive 106 to the drive wheel 70 of the lawn maintenance vehicle 20 thus causing rotation of the drive wheel 70 to induce travel of the lawn maintenance vehicle 20.

Returning to FIG. 4, the second operable connection can include several linkage components of any suitable configuration. In the shown example, the first link 76 includes a second end 150 which is connected to a linkage lever 154. The linkage lever 154 can be generally configured into an "L" shape as shown. One end 156 of the linkage lever 154 is connected to the second end 150 of the first link 76. The linkage lever 154 is mounted to a portion of the frame of the lawn maintenance vehicle 20 at the right angle portion of the "L" shape. In one example, the linkage lever 154 is mounted to the frame of the lawn maintenance vehicle 20 with a threaded fastener 158. The mounted connection of the linkage lever 154 to the frame of the lawn maintenance vehicle 20 enables the linkage lever 154 to rotate about the central axis of the threaded fastener 158. Another end 160 of the linkage lever 154 is connected to a second link 164.

The second link 164 can extend from the linkage lever 154 to a third link 166. In the shown example, the third link 166 includes a connection location 168 for connection to the second link 164. The third link 166 and the second link 164 can be connected with a threaded fastener 170 such as a hex head bolt and a nut. In one example, the connection between the second link 164 and the third link 166 enables relative rotational motion between the second link 164 and the third link 166 during operation of the links.

Figure 7:
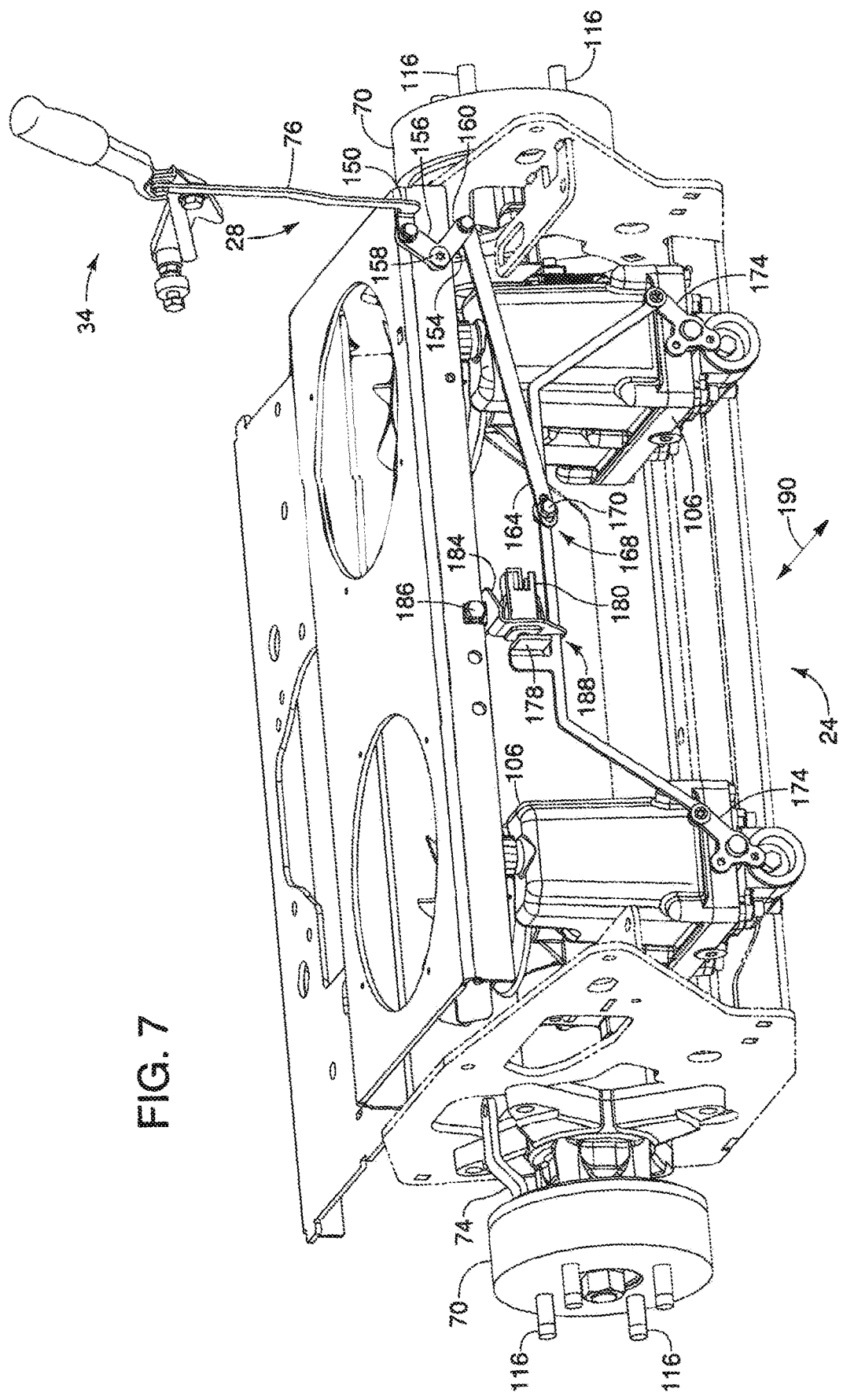
FIG. 7 is similar to FIG. 4 with the park brake mechanism and the second operable connection in an engaged position.

The third link 166 can span the distance between two separate traction drives 106. Each traction drive 106 includes a bypass lever 174 which, when moved to an engaged position, places the traction drive 106 in a disable mode as can be seen schematically in FIG. 6. The third link 166 can be connected to the bypass levers 174 such that physical motion of the third link 166 moves the bypass levers 174 from a disengaged position to an engaged position. In the shown example, the bypass levers 174 are rotated between the two positions. FIG. 4 shows the bypass levers 174 in the disengaged position while FIG. 7 shows the bypass levers 174 in the engaged position. The third link 166 is configured to cause the bypass levers 174 to operate in cooperation such that both bypass levers 174 are in the same position relative to each other, i.e., both bypass levers 174 are in the engaged position at one time or both bypass levers 174 are in the disengaged position at one time and operate identically. This cooperation helps prevent drive wheel 70 dragging and other undesired effects.

Figure 8:
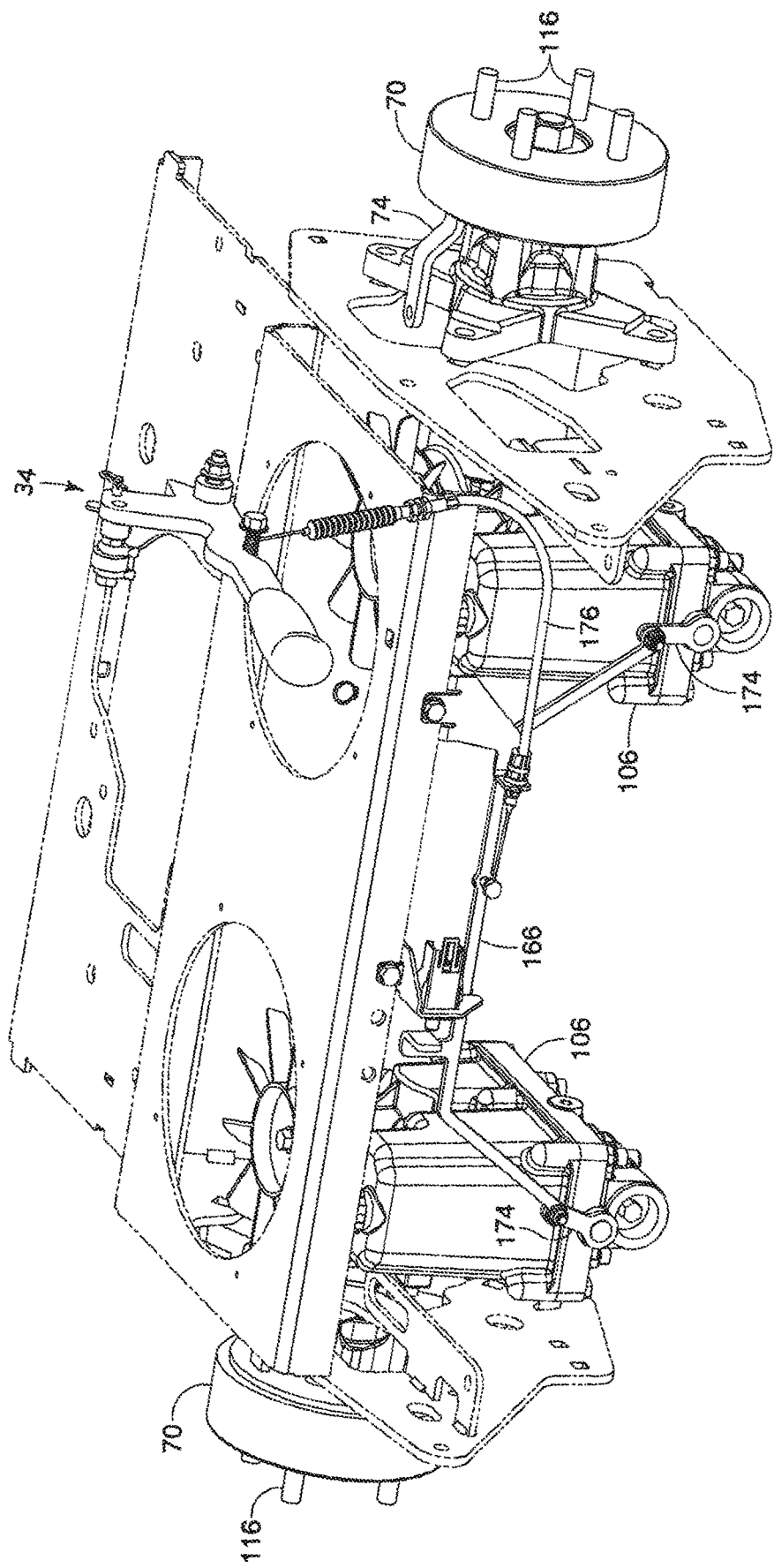
FIG. 8 is similar to FIG. 4 showing an alternative second operable connection.

As described, a number of components such as the first link 76, the second link 164, the third link 166, and the linkage lever 154 form a traction drive bypass linkage. For example, the second operable connection can be the traction drive bypass linkage which is connected to at least one traction drive bypass lever 174. However, other examples can include fewer components such as a single link, a cable, or may even include electrical or electronic connections serving as the second operable connection between the park brake mechanism 28 and the traction drive 106. FIG. 8 shows the second operable connection comprising a cable 176. In one example, the cable 176 can be a "push/pull" cable which can transmit force in both directions (i.e., the cable can effectively transmit force while pulling or pushing).

As previously described, the lawn maintenance vehicle 20 can include a plurality of drive wheels 70. In one example, the second operable connection between the park brake mechanism 28 and the traction drive 106 activates the disable mode of at least one traction drive 106 associated with each drive wheel 70 of the lawn maintenance vehicle 20. The second operable connection rotates the bypass levers 174 from a disengaged position to an engaged position. The bypass levers 174 can be connected to the bypass valve 130 (best shown in FIG. 6) such that engagement of the bypass levers 174 opens the bypass valves 130, thereby activating the hydraulic bypass 128 of each of the traction drives 106.

From an operating standpoint, the park brake handle 26 can be in the disengaged position as shown in FIGS. 3 and 4. When the park brake handle 26 is in the disengaged position, the bypass lever 174 of the traction drive 106 is also in the disengaged position. As the park brake handle 26 is rotated about the axis 40 to be placed in the engaged position, the lever 78 rotates in concert with the park brake handle 26, thus rotating the first arm 80 of the lever 78 about the axis 40 (best shown in FIG. 2). This motion urges the first link 76 in an upward direction, thereby causing the one end of the linkage lever 154 to rotate about the threaded fastener 158. This rotation causes the second link 164 to move generally to the right to urge the third link 166 to also move to the right. Movement of the third link 166 to the right rotates the bypass levers 174 into the engaged position (as shown in FIG. 7), thereby placing each traction drive 106 in the bypass or disable mode such that no traction force is transmitted to the drive wheel 70. As such, when the park brake mechanism 28 is in the engaged position, the second operable connection activates or engages the disable mode of the traction drive 106.

Returning to FIG. 4, the traction drive bypass linkage can also include a tab 178. The tab 178 can be located proximally to and attached to the third link 166. The tab 178 is configured to interact with a sensor 180 which detects the activation or engagement of the disable mode of the traction drive 106. Any suitable sensor can be used to detect the engagement of the disable mode including, but not limited to, an electronic sensor, an electrical sensor, a mechanical switch, etc. In one example, the sensor 180 is a multi-pole switch. As the traction drive bypass linkage is moved to the engaged position, the mechanical switch is selectively activated by contact with the traction drive bypass linkage as the tab 178 depresses a portion of the sensor 180. The sensor 180 can generate an electrical signal based upon the depressed or extended position of the sensor 180. For example, the sensor 180 can generate an electrical signal to indicate that the park brake mechanism 28 is in the engaged position when the described portion of the sensor 180 is in the depressed position.

In at least one example, the sensor 180 can be mounted to a bracket 184. The bracket 184 can be attached to a portion of the frame with the use of a threaded fastener 186 or any other suitable fastening means. In one example, the bracket 184 can define a slot 188 which can accept a portion of the second operative connection (e.g., the third link 166) in order to increase the stability of the second operative connection in a direction as represented by arrow 190.

Figure 9:
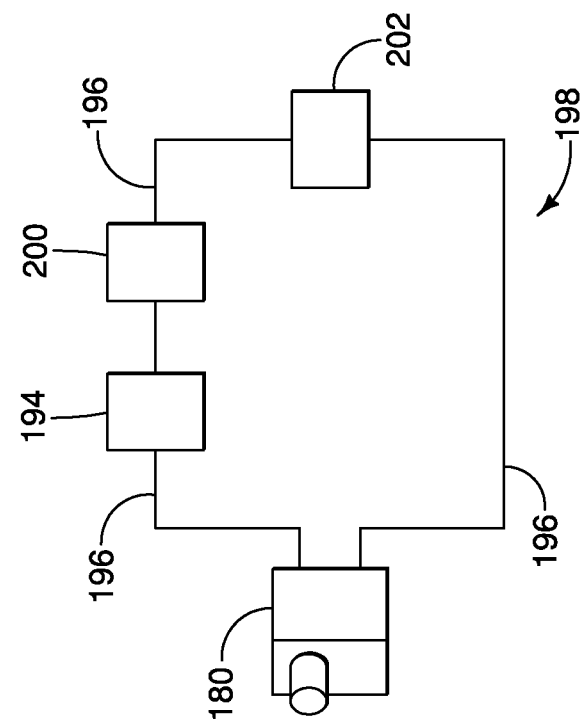
FIG. 9 is a schematic representation of a hydrostatic traction drive control circuit which can be used in the lawn maintenance vehicle of FIG. 1.

Turning to FIG. 9, a schematic representation of a hydrostatic fraction drive control circuit is shown. The sensor 180 can be in electrical communication with a vehicle start system 194 through an electrical conductor 196 in a control circuit 198. An electrical signal indicating that the park brake mechanism 28 is in the engaged position can be sent from the sensor 180 to the vehicle start system 194. Without the signal, the vehicle start system 194 is deactivated. In this condition, the vehicle start system 194 prevents an operator from starting the lawn maintenance vehicle 20 because the wheel brake (parking brake) and the disable mode of the traction drive 106 are disengaged. The configuration of the control circuit 198 helps ensure that when the park brake mechanism 28 is located in the engaged position, the sensor 180 sends an electrical signal over the conductor 196, and the vehicle start system 194 is activated. Activation of the vehicle start system 194 enables the operator to start the lawn maintenance vehicle 20. In this arrangement, the electrical interlock between the sensor 180 and the vehicle start system 194 proves that the hydraulic system is in the bypass mode prior to enabling the vehicle start system 194. As such, the operator cannot start the lawn maintenance vehicle 20 if the park brake mechanism 28 is in the disengaged position.

Additionally, the sensor 180 can be in electrical communication with a vehicle operator presence control 200. Typically, the vehicle operator presence control 200 monitors the presence of an operator on the lawn maintenance vehicle 20 and shuts down the power source 202 of the lawn maintenance vehicle 20 (e.g., an internal combustion engine) when the operator is not in a designated position (e.g., in a driver's seat). However, there are instances when it is beneficial to maintain the power source for the lawn maintenance vehicle 20 while the operator is not in the designated position. For example, the operator may wish to keep the lawn maintenance vehicle 20 powered when emptying grass collection bags or moving objects from the path of the lawn maintenance vehicle 20. For these instances, the sensor 180 can send a signal to deactivate the vehicle operator presence control 200 when the park brake mechanism 28 is located in the engaged position.

It is at times beneficial to place the traction drive 106 of a lawn maintenance vehicle 20 into the disable mode. For example, the traction drive 106 can be placed in the disable mode to ease operations such as towing and pushing the lawn maintenance vehicle 20. In each of these cases, the lawn maintenance vehicle 20 may only be moved using an outside force rather than the traction drive 106. As such, nominal force is required to overcome inertia and rolling friction to move the lawn maintenance vehicle 20 while in the bypass mode. However, without a bypass mode, it is not possible to move the lawn maintenance vehicle 20 due to the resistance in the traction drive 106 caused by the fluidly connected pump 108 and the hydraulic motor 110. Instead, placing the traction drive 106 in the bypass mode acts as a "neutral gear" and significantly reduces the resistance to rolling motion during towing and pushing operations.

Turning to FIG. 11, in order to place the traction drive 106 into the disable mode to ease towing and pushing the lawn maintenance vehicle 20, the park brake mechanism 28 can further include a park brake handle bypass lever, or more simply, a lever 300. The lever 300 enables the hydrostatic traction drive 106 to be placed in the bypass mode while the park brake handle 26 remains in the disengaged position. In this way, the bypass levers 174 can be actuated separately from the park brake handle 26 (and thus, the wheel brakes) as needed in times when it is desirable to place the hydrostatic fraction drive 106 in the bypass mode to ease towing and pulling while the wheel brakes remain disengaged.

Remaining at FIG. 11, the second operable connection (e.g., cable 176) between the park brake mechanism 28 and the hydrostatic traction drive 106 can be configured to be selectively operable independently of the park brake handle 26. In one example, the park brake mechanism 28 includes the lever 300 which can be rotatably mounted to the park brake handle 26. The second operable connection is mounted to the lever at point 302 and the lever 300 is configured to be selectively operable independently of the park brake handle 26.

The lever 300 can include a tab 304 at the top of the lever 300 which cooperates with a portion of the park brake handle 26. As the park brake handle is rotated upward, interaction between the portion of the park brake handle 26 and the tab 304 urge rotation of the lever 300 commensurate with the rotation of the park brake handle 26. Additionally, the lever 300 can include a locking tab 306 which cooperates with a portion of the park brake handle 26 to urge downward rotation of the lever 300 upon downward rotation of the park brake handle 26. The tab 304 and the locking tab 306 cooperate with the park brake handle 26 on either side as shown in FIG. 11 such that the lever 200 operates dependently with the park brake handle 26.

As described above, it is, at times, advantageous to operate the bypass levers 174 (best shown in FIG. 4) of the hydrostatic traction drive 106 independently of the wheel brakes which are activated (or engaged) by the park brake handle 26. The lever 300 can be operated independently of the park brake handle 26 as shown in FIG. 12. The second operable connection can be attached to point 308 of the lever 300, and as the lever 300 rotates upward, the second operable connection rotates the bypass levers 174 of the traction drive 106 to place the traction drive 106 in a bypass mode. FIGS. 14 and 15 illustrate other views of the locking tab 306.

In order to enable the independent motion of the lever 300, the lever 300 can be selectively urged away from the park brake handle 26 to a release position as shown in FIG. 13. Here, the locking tab 306 no longer cooperates with the park brake handle 26, and the lever 300 can be freely rotated to place the traction drive in the bypass mode. In this way, the lever 300 to operates independently of the park brake handle 26. In one example, the lever 300 is constructed of spring steel such that placement of the lever 300 in the release position does not cause any plastic deformation, and the lever 300 reverts back to its original shape upon removal of the operator's force.

Furthermore, the lever 300 can be configured to automatically reset itself to operate dependently with the park brake handle 26 when the park brake handle 26 is placed in the engaged position. In one example, the park brake handle 26 is configured to slide past the locking tab 306 upon upward rotation of the park brake handle 26. In one example, the locking tab 306 elastically deforms as the park brake handle 26 is rotated upward to its engaged position, slides past the park brake handle 26, and then reverts back to its original shape to once again cooperate with a side of the park brake handle 26. In other examples, lateral motion of the park brake handle 26, and/or the lever 300, or a combination of lateral motion and elastic deformation combine to enable the locking tab 306 to move back into position to cooperate with the park brake handle 26. Once the locking tab 306 is able to cooperate with the portion of the park brake handle 26, this enables the lever 300 to operate dependently with the park brake handle 26. As such, the locking tab 306 will automatically re-engage the park brake handle 26 as the operator places the park brake handle 26 into the engaged position. This is useful so that if the operator forgets to return the bypass lever 300, the lever 300 will automatically "lock up" when the operator applies the wheel brakes with the park brake handle 26. Applying the wheel brakes must be done to enable a starting operation of the lawn maintenance vehicle 20.

Figure 10:
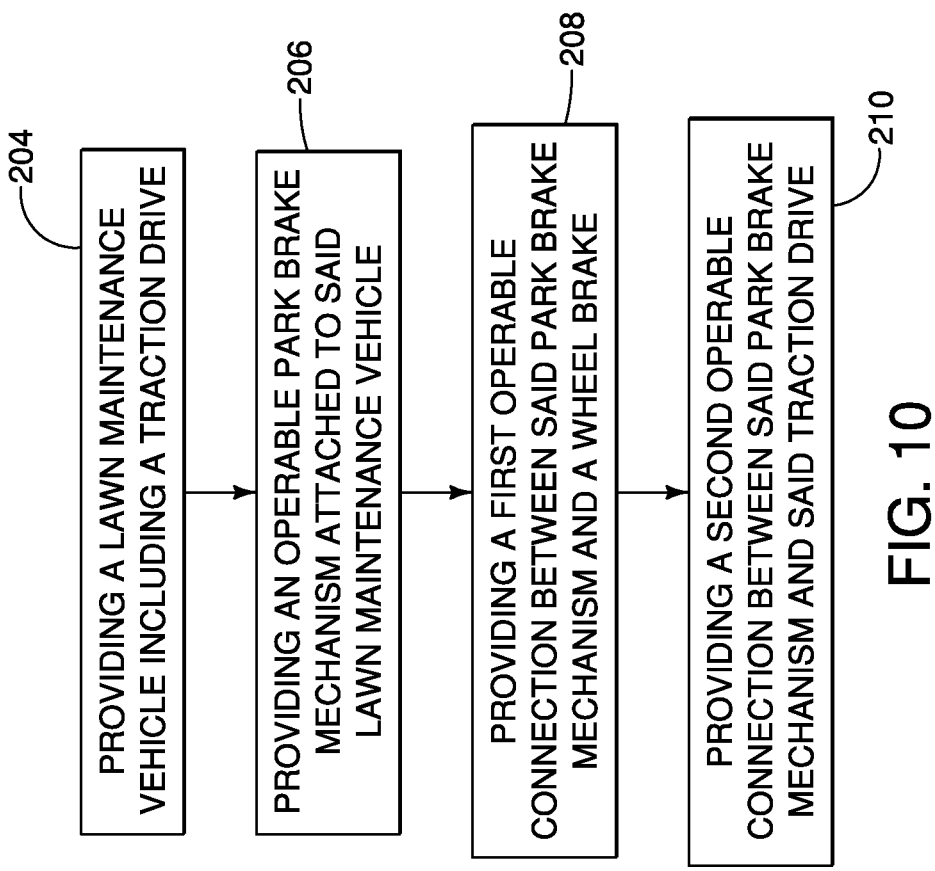
FIG. 10 is a top level flow diagram of an example method of controlling a lawn maintenance vehicle.

Turning to FIG. 10, a method of controlling a lawn maintenance vehicle will now be discussed. The method includes the step 204 of providing a lawn maintenance vehicle including a traction drive. The traction drive includes a disable mode. The method further includes the step 206 of providing an operable park brake mechanism attached to the lawn maintenance vehicle. The park brake mechanism is selectively operable between an engaged position and a disengaged position. The method also includes the step 208 of providing a first operable connection between the park brake mechanism and a wheel brake. When the park brake mechanism is in the engaged position, the first operable connection activates the wheel brake. The method further includes the step 210 of providing a second operable connection between the park brake mechanism and the traction drive. When the park brake mechanism is in the engaged position, the second operable connection activates the disable mode of the traction drive.

In other examples of the method, a step of providing a vehicle start system can be included. The method can also include the step of providing a sensor. The sensor detects the activation of the disable mode of the traction drive and the sensor electrically communicates with the vehicle start system and the vehicle operator presence control. When the park brake mechanism is located in the engaged position, the vehicle start system is activated and the vehicle operator presence control is deactivated as previously described.

It is to be understood that the disclosed methods and apparatus for a lawn maintenance vehicle park brake and traction drive interlock can provide several advantages. In one example, the lawn maintenance vehicle park brake and traction drive interlock eliminates the need for at least one, and sometimes a number of complicated electrical, electronic, or mechanical interlocks to satisfy various American National Standards Institute (ANSI) published standards regarding lawn maintenance vehicles. The application of the park brake mechanism provides for activation of a sensor for the park brake engaged position and the traction drive bypass mechanisms. In order to start the lawn maintenance vehicle, the speed-directional control levers of a typical lawn maintenance vehicle do not have to be in their neutral positions, but the park brake mechanism must be in the engaged (or "applied") position so that the traction drive bypass mechanism is engaged. As discussed, this engaged position also activates the vehicle start system and deactivates the vehicle operator presence control. This activation and deactivation is accomplished by means of a multi-pole switch that is activated by the park brake mechanism when it is fully engaged. Additionally, the disclosed methods and apparatus prevent activation of the lawn maintenance vehicle start system unless the traction drive(s) are in the bypass mode and the park brake is engaged.

Additionally, the described device can prevent lawn maintenance vehicle "creep" while the park brake is activated. The interconnection between the park brake mechanism and the hydraulic traction drive places the traction drive in a bypass mode which prevents rotational force being transferred to the drive wheel(s) from the traction drive.

With the disclosed apparatus and methods, an operator no longer requires a complicated interlock to disengage the fraction drive of a lawn maintenance vehicle prior to starting the lawn maintenance vehicle. Now, the park brake mechanism can place the traction drive in a bypass mode through a relatively simple connection as the park brake is engaged. As such, there is no need to include sensors and/or switches at each lap bar (i.e., speed control levers) to interlock the drive unit of the lawn maintenance vehicle. These sensors and/or switches are typically located at a position enabling the sensor and/or switch to "read" the location of the lap bar in a central position when the lap bar is rotated outward. In another example, the park brake and traction drive interlock can eliminate the need for a device configured to remove a drive belt from engaging another part of the drive system of the lawn maintenance vehicle. Removal of either of these features while still adhering to ANSI standards enables reduction in assembly time and reduction in lawn maintenance vehicle assembly cost.

Another benefit of the described apparatus and methods can be a reduction in load on the starter for the lawn maintenance vehicle at the time of start-up. As the park brake mechanism is engaged, the traction drive is placed in the bypass mode such that the hydraulic drive components are not in the hydraulic fluid path of the traction drive components. As such, the starter encounters a lesser load to overcome in order to start the lawn maintenance vehicle engine, because the transmission, or hydraulic motor/pump combination is disengaged, or in the bypass mode.

The described methods and apparatus can also enable a mechanism which will engage the lawn maintenance vehicle park brake and activate a position sensor switch while simultaneously placing the fraction drive into the bypass mode. The traction drive can be placed in the bypass mode in any number of ways, including mechanically or electrically. As such, the single action of engaging the park brake mechanism both engages the parking brake of a drive wheel and places the traction drive into the bypass mode, rather than requiring the operator to conduct two separate actions.

The described methods and apparatus can also enable a simple way to accomplish a traction drive bypass engaged by a typical operator action. The park brake mechanism is activated by a hand-operated lever (e.g., the park brake handle 26), which is connected through cables or linkage elements to the bypass levers on both traction drive units. A separate cable or linkage rod connects to the bypass lever which also activates a sensor for the vehicle start system while deactivating the vehicle operator presence control. Engagement of the park brake mechanism can allow the lawn maintenance vehicle to be started while preventing lawn maintenance vehicle travel because the traction drive is in the bypass mode.

The described methods and apparatus can also enable an improved lawn maintenance vehicle from the aspects of maintenance and fuel efficiency. In the described examples, the pump can be a variable displacement pump such that the internal combustion engine associated with the lawn maintenance vehicle can be driven at a particular, desired rotational speed for optimal efficiency while varying the drive speed. As such, the internal combustion engine can continually operate at an optimal revolutions per minute (RPM) regardless of the output speed required to drive the lawn maintenance vehicle. This constant, optimal speed can both reduce long-term wear on the engine and increase fuel efficiency.

While this invention has been described in conjunction with the specific embodiments described above, it is evident that many alternatives, combinations, modifications and variations are apparent to those skilled in the art. Accordingly, the preferred embodiments of this invention, as set forth above are intended to be illustrative only, and not in a limiting sense. Various changes can be made without departing from the spirit and scope of this invention. Combinations of the above embodiments and other embodiments will be apparent to those of skill in the art upon studying the above description and are intended to be embraced therein. Therefore, the scope of the present invention is defined by the appended claims, and all devices, processes, and methods that come within the meaning of the claims, either literally or by equivalence, are intended to be embraced therein. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A lawn maintenance vehicle park brake and traction drive interlock comprising:
    a park brake mechanism mounted to a lawn maintenance vehicle, said park brake mechanism is selectively operable between an engaged position and a disengaged position;
    a traction drive mounted to said lawn maintenance vehicle, said traction drive comprises a disable mode which prohibits transmission of a driving force from said traction drive to a drive wheel of said lawn maintenance vehicle;
    a first operable connection between said park brake mechanism and a wheel brake, wherein when said park brake mechanism is in the engaged position, said first operable connection activates said wheel brake; and a second operable connection between said park brake mechanism and said traction drive, wherein when said park brake mechanism is in the engaged position, said second operable connection activates said disable mode of said traction drive;
    a sensor, wherein said sensor detects the activation of said disable mode of said traction drive; and
    wherein said sensor is in electrical communication with a vehicle operator presence control, wherein when said park brake mechanism is located in the engaged position, said vehicle operator presence control is deactivated.

2. The lawn maintenance vehicle park brake and traction drive interlock of claim 1, wherein said traction drive comprises a pump and a hydraulic motor.

3. The lawn maintenance vehicle park brake and traction drive interlock of claim 2, wherein said disable mode comprises a hydraulic bypass.

4. The lawn maintenance vehicle park brake and traction drive interlock of claim 1, wherein said sensor is in electrical communication with a vehicle start system, wherein when said park brake mechanism is located in the engaged position, said vehicle start system is activated.

5. The lawn maintenance vehicle park brake and traction drive interlock of claim 1, wherein said sensor is a mechanical switch.

6. The lawn maintenance vehicle park brake and traction drive interlock of claim 5, wherein said mechanical switch is a multi-pole switch.

7. The lawn maintenance vehicle park brake and traction drive interlock of claim 5, wherein said second operable connection comprises a traction drive bypass linkage, wherein said traction drive bypass linkage is connected to at least one traction drive bypass lever.

8. The lawn maintenance vehicle park brake and traction drive interlock of claim 7, wherein said mechanical switch is selectively activated by contact with said traction drive bypass linkage.

9. The lawn maintenance vehicle park brake and traction drive interlock of claim 1, further comprising a plurality of said wheel brakes and a plurality of said first operable connections, wherein each one of said wheel brakes acts on one of said drive wheels of the lawn maintenance vehicle, wherein each of said first operable connections are located between said park brake mechanism and one of said wheel brakes.

10. The lawn maintenance vehicle park brake and traction drive interlock of claim 1, wherein said second operable connection between said park brake mechanism and said traction drive activates said disable mode of at least one traction drive associated with each drive wheel of the lawn maintenance vehicle.

11. A method of controlling a lawn maintenance vehicle with a park brake and traction drive interlock comprising:
    providing a lawn maintenance vehicle including a traction drive, said traction drive includes a disable mode;
    providing an operable park brake mechanism attached to said lawn maintenance vehicle, said park brake mechanism being selectively operable between an engaged position and a disengaged position;
    providing a first operable connection between said park brake mechanism and a wheel brake, wherein when said park brake mechanism is in the engaged position, said first operable connection activates said wheel brake;
    providing a second operable connection between said park brake mechanism and said traction drive, wherein when said park brake mechanism is in the engaged position, said second operable connection activates said disable mode of said traction drive;
    providing a vehicle start system and a vehicle operator presence control; and
    providing a sensor, wherein said sensor detects the activation of said disable mode of said traction drive, wherein said sensor electrically communicates with said vehicle start system and said vehicle operator presence control, wherein when said park brake mechanism is located in the engaged position, said vehicle start system is activated and said vehicle operator presence control is deactivated.

12. A lawn maintenance vehicle park brake and traction drive interlock comprising:
- a park brake mechanism mounted to a lawn maintenance vehicle including a park brake handle, said park brake handle is selectively operable between an engaged position and a disengaged position;
- a traction drive mounted to said lawn maintenance vehicle, said traction drive comprises a disable mode which prohibits transmission of a driving force from said traction drive to a drive wheel of said lawn maintenance vehicle;
- a first operable connection between said park brake mechanism and a wheel brake, wherein when said park brake mechanism is in the engaged position, said first operable connection activates said wheel brake;
- a second operable connection between said park brake mechanism and said traction drive, wherein when said park brake mechanism is in the engaged position, said second operable connection activates said disable mode of said traction drive, wherein said second operable connection between said park brake mechanism and said traction drive is configured to be selectively operable independently of said park brake handle; and
- a lever, wherein said second operable connection is mounted to said lever which is configured to be selectively operable independently of said park brake handle; and
- wherein said lever comprises a locking tab, said locking tab cooperates with a portion of said park brake handle to urge rotation of said lever upon downward rotation of said park brake handle.

13. The lawn maintenance vehicle park brake and traction drive interlock of claim 12, wherein said lever is rotatably mounted to said park brake handle.

14. The lawn maintenance vehicle park brake and traction drive interlock of claim 12, wherein a portion of said lever is configured to be selectively urged away from said park brake handle to a release position, wherein said locking tab does not cooperate with a portion of said park brake handle, wherein the release position enables said lever to operate independently of said park brake handle.

15. The lawn maintenance vehicle park brake and traction drive interlock of claim 12, wherein said park brake handle is configured to slide past said locking tab upon upward rotation to enable said locking tab to cooperate with said portion of said park brake handle thereby enabling said lever to operate dependently of said park brake handle.

* * * * *